United States Patent
Amarthaluri et al.

(10) Patent No.: US 10,776,796 B2
(45) Date of Patent: Sep. 15, 2020

(54) SYSTEMS AND METHODS FOR MATCHING DATA FROM AN EXTERNAL CATALOG WITH DATA IN AN INTERNAL CATALOG

(71) Applicant: WAL-MART STORES, INC., Bentonville, AR (US)

(72) Inventors: Abilash Amarthaluri, San Jose, CA (US); Chandni Jain, Santa Clara, CA (US); Zuzar Fakhruddin Nafar, Mountain View, CA (US); Rohit Deep, Union City, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 296 days.

(21) Appl. No.: 15/605,824

(22) Filed: May 25, 2017

(65) Prior Publication Data
US 2018/0341955 A1     Nov. 29, 2018

(51) Int. Cl.
G06Q 30/00 (2012.01)
G06Q 30/02 (2012.01)
G06Q 10/08 (2012.01)

(52) U.S. Cl.
CPC ....... *G06Q 30/0201* (2013.01); *G06Q 10/087* (2013.01)

(58) Field of Classification Search
CPC .......... G06Q 30/0603; G06Q 30/0643; G06Q 30/0641; G06Q 30/00; G06Q 30/0601
See application file for complete search history.

(56) References Cited

U.S. PATENT DOCUMENTS

| | | | | |
|---|---|---|---|---|
| 8,069,096 B1* | 11/2011 | Ballaro | ........... | G06Q 10/087 705/27.2 |
| 8,160,984 B2* | 4/2012 | Hunt | ........... | G06Q 20/0855 358/474 |
| 8,249,885 B2* | 8/2012 | Berkowitz | ........... | G06Q 30/06 705/1.1 |
| 8,290,925 B1* | 10/2012 | Anandan | ........... | G06F 16/313 707/707 |
| 8,341,189 B2* | 12/2012 | Campbell | ........... | G06F 16/25 707/795 |

(Continued)

OTHER PUBLICATIONS

Aanen, Steven S. et al., Schema—An Algorithm for Automated Product Taxonomy Mapping in E-commerce EWSC 2012 (Year: 2012).*

(Continued)

*Primary Examiner* — Scott L Jarrett
(74) *Attorney, Agent, or Firm* — Bryan Cave Leighton Paisner LLP

(57) ABSTRACT

Systems and methods including one or more processing modules and one or more non-transitory storage modules storing computing instructions configured to run on the one or more processing modules and perform acts of receiving an external catalog comprising external attributes for each product of a plurality of products, mapping the external attributes from the external catalog to internal attributes for each product of the plurality of products in an internal catalog for an online retailer using an ensemble learning technique comprising a plurality of algorithms, incorporating the external attributes of the external catalog into the internal attributes in the internal catalog as mapped, and coordinating displaying of the external attributes and the internal attributes on a website of the online retailer.

20 Claims, 5 Drawing Sheets

400

405 – Receiving an external catalog comprising one or more external attributes for each product of a plurality of products.

↓

410 – Mapping the one or more external attributes from the external catalog to one or more internal attributes for each product of the plurality of products in an internal catalog for an online retailer using a first set of rules that comprise an ensemble learning technique comprising a plurality of algorithms.

↓

415 – Incorporating the one or more external attributes of the external catalog into the one or more internal attributes in the internal catalog as mapped.

↓

420 – Coordinating displaying of the one or more external attributes and the one or more internal attributes on a website of the online retailer.

(56) References Cited

U.S. PATENT DOCUMENTS

| | | | | |
|---|---|---|---|---|
| 8,515,968 | B1* | 8/2013 | Bayardo | G06Q 30/00 707/748 |
| 8,635,123 | B2* | 1/2014 | Ren | G06Q 10/087 705/26.1 |
| 8,655,737 | B1* | 2/2014 | Tromble | G06Q 30/00 705/1.1 |
| 8,799,103 | B1* | 8/2014 | Federighi | G06Q 10/08 705/26.25 |
| 9,589,293 | B1* | 3/2017 | Yalamanchi | G06Q 30/0625 |
| 9,865,012 | B2* | 1/2018 | Vidal | G06Q 30/0631 |
| 10,042,895 | B1* | 8/2018 | Geva | G06F 16/24578 |
| 10,198,507 | B2* | 2/2019 | Pawar | G06F 16/36 |
| 10,204,362 | B2* | 2/2019 | Wang | G06Q 30/0601 |
| 2003/0106023 | A1* | 6/2003 | Saucier | G06F 17/5045 715/234 |
| 2003/0212640 | A1* | 11/2003 | Andresen | G06Q 10/087 705/64 |
| 2004/0044951 | A1* | 3/2004 | Repko | G06Q 30/06 715/224 |
| 2004/0143600 | A1 | 7/2004 | Musgrove et al. | |
| 2005/0193029 | A1* | 9/2005 | Rom | G06Q 30/00 |
| 2008/0071642 | A1* | 3/2008 | Leiba | G06Q 30/0623 705/26.61 |
| 2008/0077475 | A1* | 3/2008 | McElhiney | G06Q 30/0201 705/7.35 |
| 2009/0012971 | A1* | 1/2009 | Hunt | G06Q 30/02 |
| 2009/0198593 | A1* | 8/2009 | Klug | G06Q 30/02 705/26.1 |
| 2009/0198594 | A1 | 8/2009 | Lu et al. | |
| 2010/0241526 | A1* | 9/2010 | Quek | G06Q 30/0601 705/26.1 |
| 2011/0087626 | A1* | 4/2011 | Yeleshwarapu | G06Q 10/087 706/12 |
| 2011/0264598 | A1* | 10/2011 | Fuxman | G06Q 30/0281 705/343 |
| 2011/0276435 | A1* | 11/2011 | Arya | G06Q 30/00 705/27.1 |
| 2012/0203675 | A1* | 8/2012 | Hassan | G06Q 30/0226 705/27.2 |
| 2013/0317869 | A1* | 11/2013 | Tan | G06Q 10/087 705/7.11 |
| 2015/0213526 | A1* | 7/2015 | Unak | G06Q 30/0601 705/26.1 |
| 2016/0283460 | A1* | 9/2016 | Weald | G06Q 30/0277 |
| 2018/0114142 | A1* | 4/2018 | Mueller | G06F 17/16 |
| 2018/0121979 | A1* | 5/2018 | Yang | G06Q 30/0603 |

OTHER PUBLICATIONS

Aanen, Steven S. et al., Automated Product Taxonomy Mapping in an E-commerce Environment Expert Systems with Applications, Aug. 2014 (Year: 2014).*
CIF Catalog Training Guide—Santa Clara County Ariba, 2013 (Year: 2013).*
Do, Hong-Hai et al., COMA—A system for flexible combination of schema matching approaches Proceedings of the 28th VLDB Conference, Hong Kong China 2002 (Year: 2002).*
Aumueller, David et al., Schema and Ontology Matching with COMA++ SIGMOD 2005, ACM, Jun. 14-16, 2005 (Year: 2005).*
Nederstigt, Lennart et al., A Lexical Approach for Taxonomy Mapping Journal of Web Engineering 2015 (Year: 2015).*
Nederstigt, Lennart et al., An automatic approach for mapping product taxonomies in E-commerce systems Lecture Notes Computer Science, vol. 7328, 2012 (Year: 2012).*
Park, Sangun et al., Ontology Mapping Between Heterogeneous Product Taxonomies in an Electronic Commerce Environment International Journal for Electronic Commerce, Winter 2007, vol. 12, No. 2, 2007 (Year: 2007).*
Melnik, Sergey et al., Similarity Flooding: A Versatile Graph Matching Algorithm and its Application to Schema Matching IEEE Computer Society, Proceedings of the 18th International Conference On Data Engineering, 2002 (Year: 2002).*
CIF Catalog Training Guide Ariba, Inc. 2010 (Year: 2010).*
Hermans, Maurice et al., A Generalization of the Winkler Extension and its Application for Ontology Mapping Proceedings of the 24th Benelux Conference on Artificial Intelligence, 2012 (Year: 2012).*
Wang, Yaoshu et al., Efficient Approximate Entity Matching Using Jaro-Walker Distance WISE 2017, Part I (Year: 2017).*

* cited by examiner

400

405 – Receiving an external catalog comprising one or more external attributes for each product of a plurality of products.

410 – Mapping the one or more external attributes from the external catalog to one or more internal attributes for each product of the plurality of products in an internal catalog for an online retailer using a first set of rules that comprise an ensemble learning technique comprising a plurality of algorithms.

415 – Incorporating the one or more external attributes of the external catalog into the one or more internal attributes in the internal catalog as mapped.

420 – Coordinating displaying of the one or more external attributes and the one or more internal attributes on a website of the online retailer.

FIG. 4

SYSTEMS AND METHODS FOR MATCHING DATA FROM AN EXTERNAL CATALOG WITH DATA IN AN INTERNAL CATALOG

TECHNICAL FIELD

This disclosure relates generally to systems and methods for matching product attribute data from an external catalog with product attribute data in an internal catalog.

BACKGROUND

On an online marketplace, online retailers can purchase or otherwise acquire product data from external or third-party sources to supplement or enrich the product data already within the internal catalog of the online retailer. A difficulty in using the product data from an external source is matching the product data from the external source with the internal taxonomy in the internal catalog of the online retailer. Conventional systems can be inefficient in not only the accuracy of matching the external product data to the internal product data, but also the significant amounts of computing resources required to match the external product data to the internal product data.

BRIEF DESCRIPTION OF THE DRAWINGS

To facilitate further description of the embodiments, the following drawings are provided in which:

FIG. 4 is a flowchart for a method, according to an embodiment; and

Figure 1:
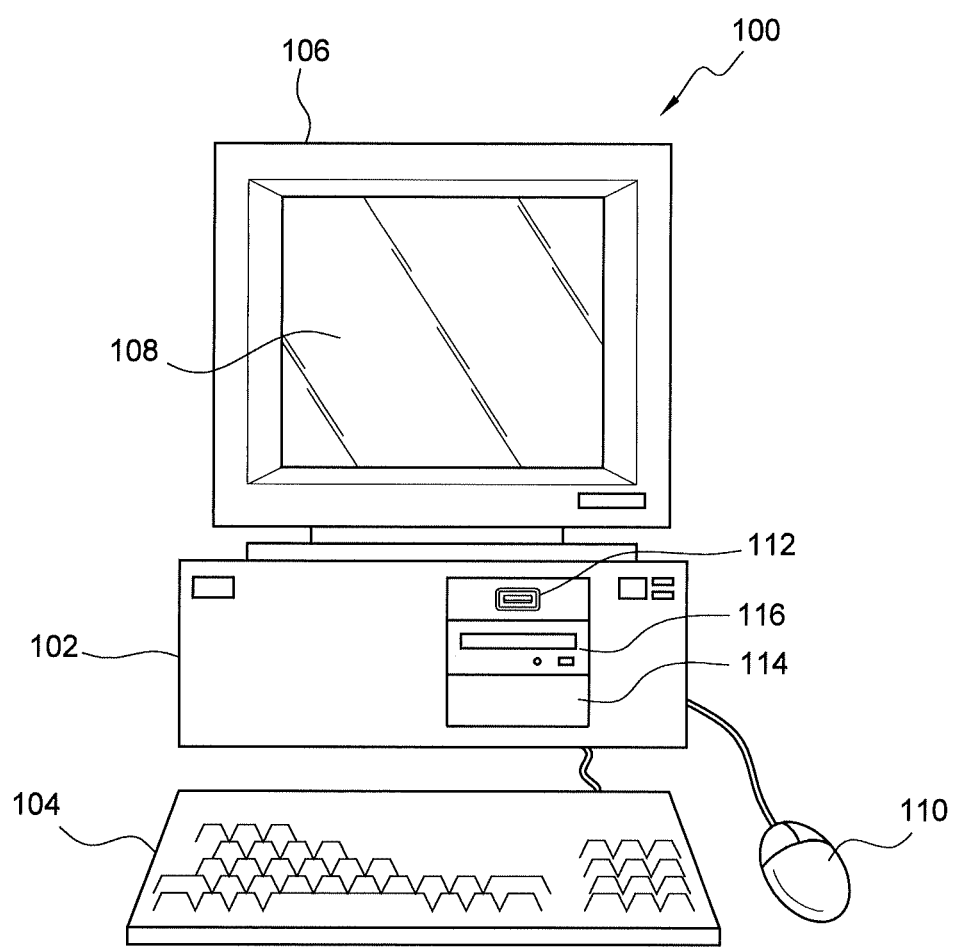
FIG. 1 illustrates a front elevational view of a computer system that is suitable for implementing various embodiments of the systems disclosed in FIGS. 3 and 5.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processing modules and one or more non-transitory storage modules storing computing instructions configured to run on the one or more processing modules. The one or more storage modules can be configured to run on the one or more processing modules and perform an act of receiving an external catalog comprising one or more external attributes for each product of a plurality of products. The one or more storage modules can be further configured to run on the one or more processing modules and perform an act of, for each product of the plurality of products, mapping the one or more external attributes from the external catalog to one or more internal attributes for each product of the plurality of products in an internal catalog for an online retailer using a first set of rules that comprise an ensemble learning technique comprising a plurality of algorithms. The one or more storage modules can be further configured to run on the one or more processing modules and perform an act of, for each product of the plurality of products, incorporating the one or more external attributes of the external catalog into the one or more internal attributes in the internal catalog as mapped. The one or more storage modules can be further configured to run on the one or more processing modules and perform an act of, for each product of the plurality of products, coordinating displaying of the one or more external attributes and the one or more internal attributes on a website of the online retailer.

Various embodiments include a method. The method can include receiving an external catalog comprising one or more external attributes for each product of a plurality of products. The method also can include, for each product of the plurality of products, mapping the one or more external attributes from the external catalog to one or more internal attributes for each product of the plurality of products in an internal catalog for an online retailer using a first set of rules that comprise an ensemble learning technique comprising a plurality of algorithms. The method also can include, for each product of the plurality of products, incorporating the one or more external attributes of the external catalog into the one or more internal attributes in the internal catalog as mapped. The method also can include, for each product of the plurality of products, coordinating displaying of the one or more external attributes and the one or more internal attributes on a website of the online retailer.

Figure 2:
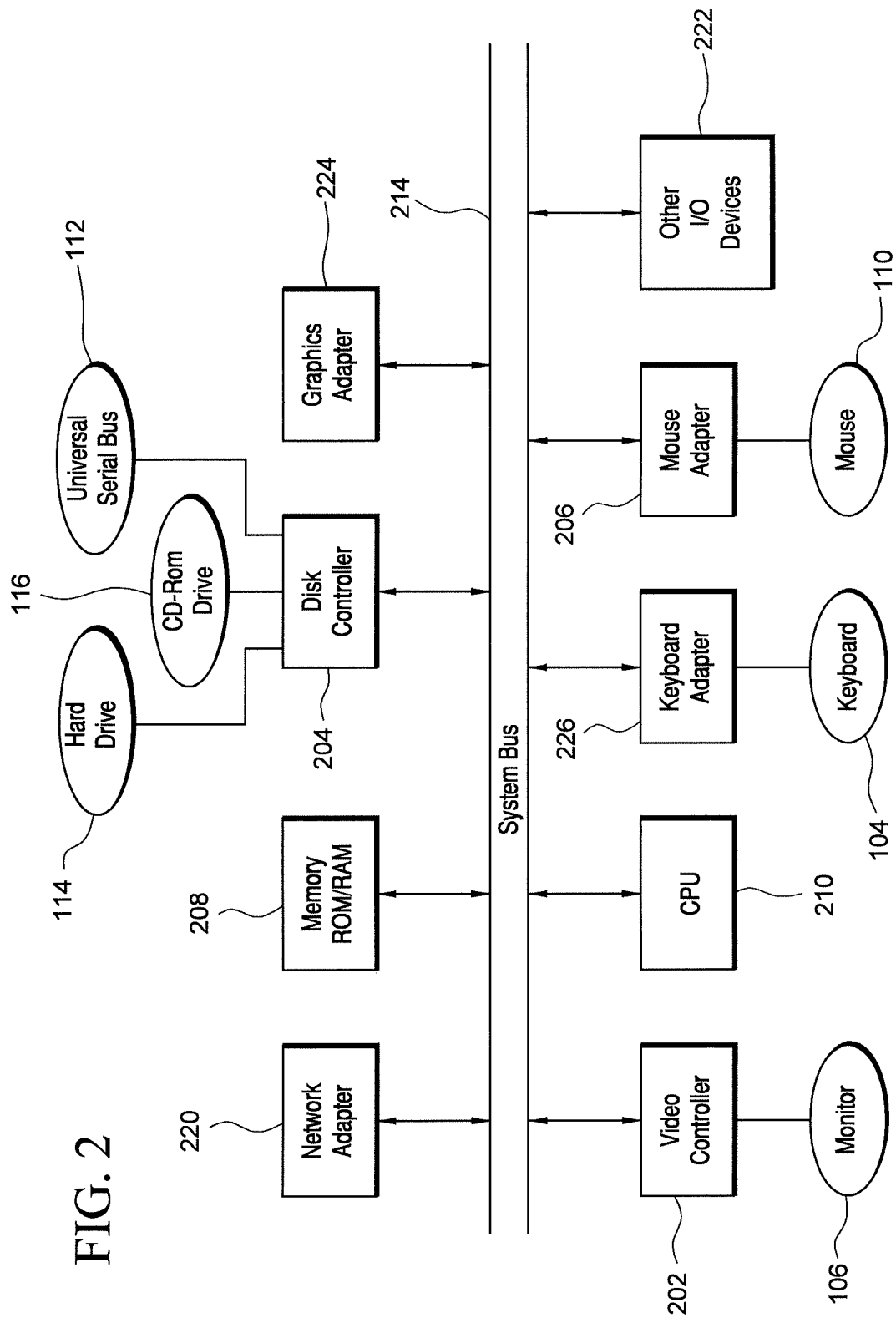
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
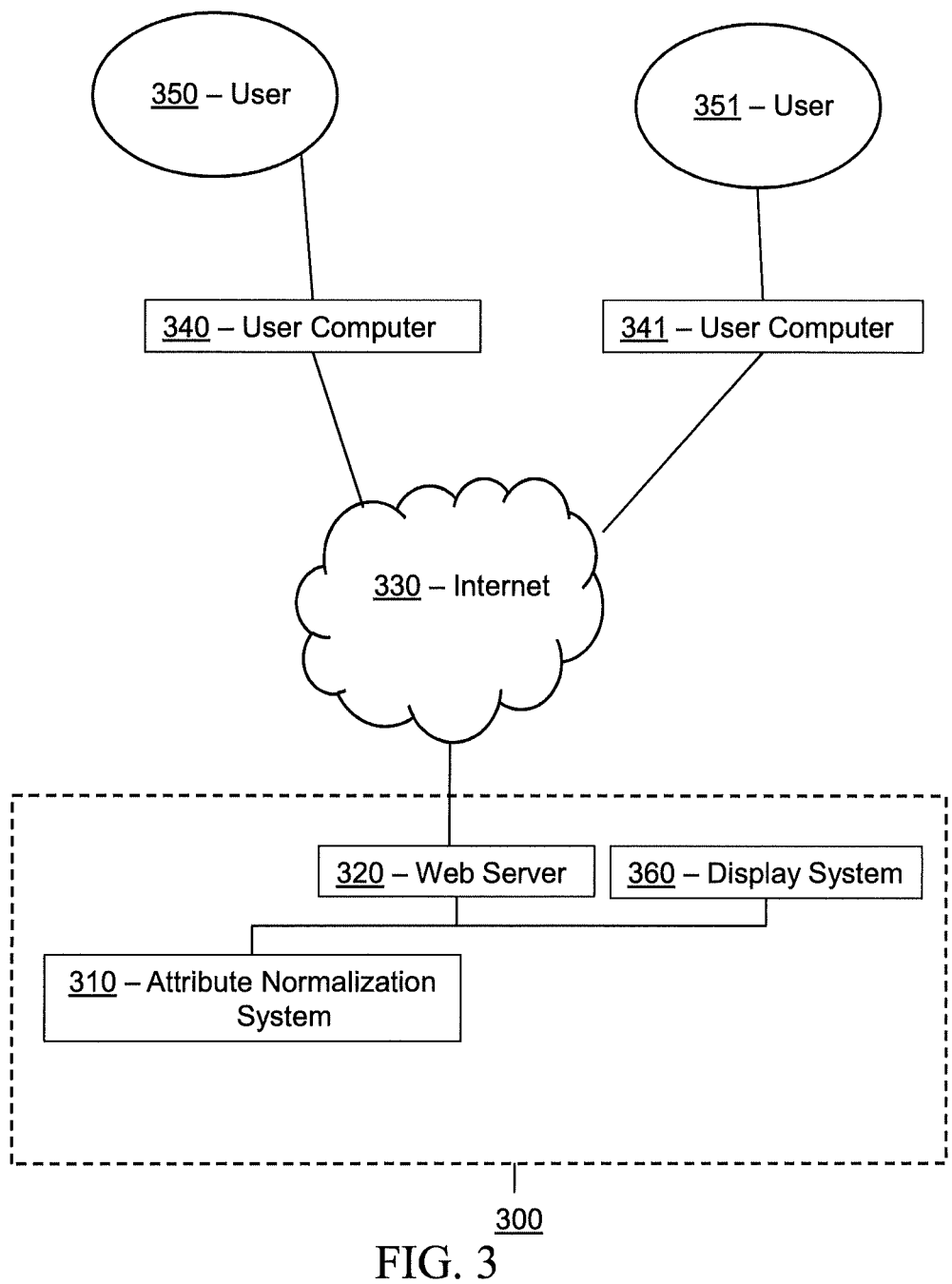
FIG. 3 illustrates a representative block diagram of a system, according to an embodiment.

Turning ahead in the drawings, FIG. 3 illustrates a block diagram of a system 300 that can be employed for matching product data from an external catalog with product data from an internal catalog, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include an attribute normalization system 310, a web server 320, and a display system 360. Attribute normalization system 310, web server 320, and/or display system 360 can each be a computer system, such as computer system 100 (FIG. 1), as described above, and can each be a single computer, a single server, or a cluster or collection of computers or servers, or a cloud of computers or servers. In another embodiment, a single computer system can host each of two or more of attribute normalization system 310, web server 320, and/or display system 360. Additional details regarding attribute normalization system 310, web server 320, and display system 360 are described herein.

In many embodiments, system 300 also can comprise user computers 340, 341. In some embodiments, user computers 340, 341 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In some embodiments, web server 320 can be in data communication through Internet 330 with user computers (e.g., 340, 341). In certain embodiments, user computers 340-341 can be desktop computers, laptop computers, smart phones, tablet devices, and/or other endpoint devices. Web server 320 can host one or more websites. For example, web server 320 can host an eCommerce website that allows users to browse and/or search for products, to add products to an electronic shopping cart, and/or to purchase products, in addition to other suitable activities.

In many embodiments, attribute normalization system 310, web server 320, and/or display system 360 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) attribute normalization system 310, web server 320, and/or display system 360 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of attribute normalization system 310, web server 320, and/or display system 360. In a similar manner, the processing module(s) and the memory storage module(s) can be local and/or remote to each other.

In many embodiments, attribute normalization system 310, web server 320, and/or display system 360 can be configured to communicate with one or more user computers 340 and 341. In some embodiments, user computers 340 and 341 also can be referred to as customer computers. In some embodiments, attribute normalization system 310, web server 320, and/or display system 360 can communicate or interface (e.g., interact) with one or more customer computers (such as user computers 340 and 341) through a network or internet 330. Internet 330 can be an intranet that is not open to the public. Accordingly, in many embodiments, attribute normalization system 310, web server 320, and/or display system 360 (and/or the software used by such systems) can refer to a back end of system 300 operated by an operator and/or administrator of system 300, and user computers 340 and 341 (and/or the software used by such systems) can refer to a front end of system 300 used by one or more users 350 and 351, respectively. In some embodiments, users 350 and 351 also can be referred to as customers, in which case, user computers 340 and 341 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, attribute normalization system 310, web server 320, and/or display system 360 also can be configured to communicate with one or more databases. The one or more databases can comprise a product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between attribute normalization system 310, web server 320, display system 360, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

Figure 5:
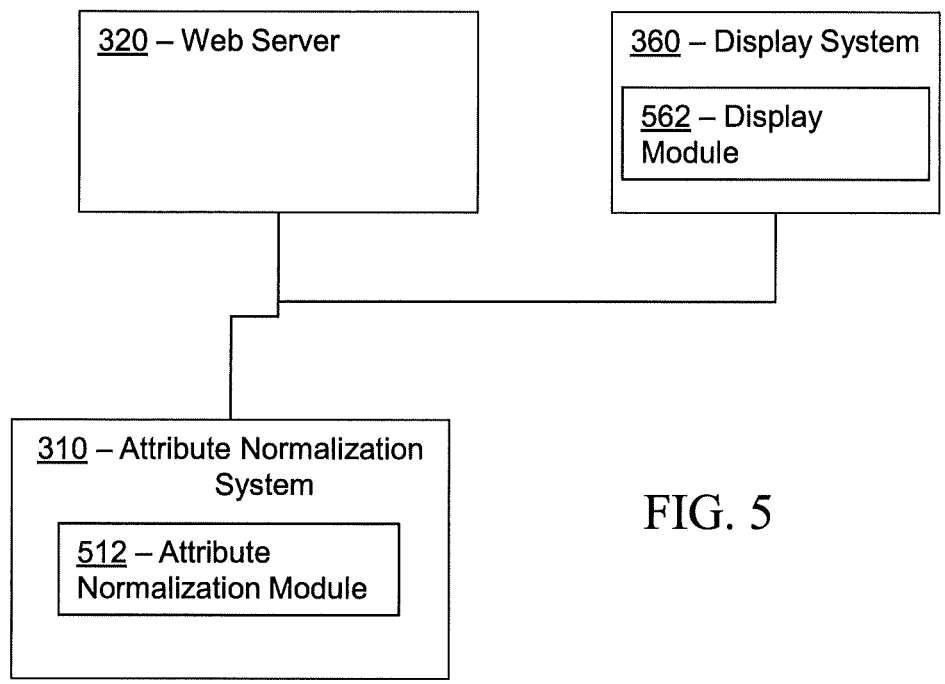
FIG. 5 illustrates a representative block diagram of a portion of the system of FIG. 3, according to an embodiment.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules 512 and/or 562 (FIG. 5). Such non-transitory memory storage modules can be part of a computer system such as attribute normalization system 310 and/or display system 360 (FIGS. 3 & 5). The processing module(s) can be similar or identical to the processing module(s) described above with respect to computer system 100 (FIG. 1).

In order to enrich an internal catalog of product data, an online retailer can acquire product data from one or more external vendors or entities. Often times, external catalogs and internal catalogs can label differently the data referring to the same product attribute. For example, while an external catalog can refer to certain values as a "screen dimension" for a television product, an internal catalog can refer to these same certain values as a "screen size" for the same television product. Before the product data from the external catalog from the external vendors can be incorporated with the product data of the internal catalog for the online retailer, the online retailer must map the external attributes of product attribute data in the external catalog to internal attributes of product attribute data in internal catalog for the online retailer. Therefore, there is a need for an effective way to map external attributes to internal attributes based on the internal taxonomy of the online retailer.

One or more embodiments of method 400 can be utilized to help integrate product data from an external catalog with product data of an internal catalog. As shall be described in greater detail below, many embodiments of method 400 can suggest one or more product attributes of a product in an internal catalog that are similar to one or more product attributes of the product in an external catalog. For example, external attributes from an external catalog can be mapped to corresponding internal attributes of an internal catalog using an ensemble learning technique that can include string matching. Some embodiments of method 400 can utilize at least one product attribute name and/or at least one product attribute value to suggest the one or more product attributes of a product in the internal catalog that are similar to the one or more product attributes of the product in the external catalog.

In many embodiments, external data from one or more external vendors or entities is acquired by an online retailer. Thus, method 400 can comprise an activity 405 of receiving an external catalog comprising one or more external attributes for each product of a plurality of products. In order to distinguish product attribute data in catalogs of an external entity from product attribute data in catalogs of the online retailer, the catalog of the external entity is referred to herein as an external catalog, and the product attributes of products within the external catalog are referred to as external attributes. Similarly, the catalog of the online retailer is referred to herein as an internal catalog, and the product attributes of products within the internal catalog are referred to as internal attributes. Thus, an internal attribute and an external attribute for a single product can reference the same attribute for the single product, hence the need to map the external product attributes to the internal product attributes. Furthermore, while reference is made herein to an online retailer, the online retailer can comprise an exclusively online retailer, or an online retailer also associated with a brick and mortar retailer.

In many embodiments, the product attributes can comprise an attribute name and/or an attribute value. Thus, the one or more external attributes for each product of the plurality of products can comprise at least one external attribute name and at least one external attribute value for each product of the plurality of products, and the one or more internal attributes for each product of the plurality of products comprise at least one internal attribute name and at least one internal attribute value for each product of the plurality of products.

By way of a non-limiting example, an incoming external attribute name can comprise "certification," and incoming external attribute values can comprise various certifications, such as but not limited to "ASTM1790-05," "ASTM ANSI Cut-Level 2," "ASTM ANSI Heat-Level 5," "certified frustration free," and/or "ASTM ANSI Puncture 2." Potential internal attributes for certification can include "certifications," "cee certifications," "hvi certification," "gots certification," "organic certification," and the like.

By way of another non-limiting example, an incoming external attribute name can comprise "ram," and incoming external attribute values can comprise "8 gb ddr2," "ddr2_sdram," "2 gb," "ddr3," and/or "ddr2." Potential internal attributes for certification can include "ram memory," "memory capacity," "internal memory," and/or "ram slot type."

By way of a non-limiting example, activity 405 can comprise an activity of receiving warranty information as an external attribute for a product in an external catalog. The internal catalog, however, may include internal product catalog attributes of warranty length, warranty type, and/or warranty url. Because of the difference between the external attribute in the external catalog and the internal attributes in the internal catalog, it is necessary to map aspects of the external attribute to the appropriate internal attribute before incorporating the external catalog with the internal catalog.

Once the external catalog is received, method 400 can further comprise an activity 410 of, for each product of the plurality of products, mapping the one or more external attributes from the external catalog to one or more internal attributes for each product of the plurality of products in an internal catalog for an online retailer using a first set of rules that can comprise an ensemble learning technique comprising a plurality of algorithms. The external attributes can relate to the internal attributes, but be referred to with a different taxonomy than the internal taxonomy of the online retailer. For example, as noted above, an external attribute can comprise warranty information for a product, while the internal attributes for the product can comprise warranty length, warranty type, and/or warranty url. Thus, various portions of the external attribute of warranty information must be mapped to one of the internal attributes of warranty length, warranty type, or warranty url for the product.

As noted above, activity 410 can utilize a first set of rules that comprise an ensemble learning technique comprising a plurality of algorithms. In many embodiments, the plurality of algorithms used in the ensemble learning technique of the first set of rules can comprise two or more string distance algorithms. In more particular embodiments, the two or more string distance algorithms can comprise two or more of a cosine similarity algorithm, a Levenshtein distance algorithm, a Jaro-Winkler distance algorithm, a n-gram distance algorithm, or a BM25 similarity algorithm. These algorithms are complicated and cannot be computed within a human's head, and thus require utilization of system 300 (FIG. 3).

In some embodiments, mapping the external attributes to the internal attributes can include a voting or determining a majority from the ensemble technique. For example, in some embodiments, activity 410 can comprise inputting the one or more external attributes and the one or more internal attributes into each algorithm of the plurality of algorithms. After the one or more internal attributes and the one or more external attributes have been inputted into each of the plurality of algorithm, activity 410 can further comprise an activity of determining the one or more external attributes match the one more internal attributes when a majority of outputs of the plurality of algorithms match the one or more external attributes with the one or more internal attributes. In many embodiments, activity 410 also can further comprise determining a confidence level that the one or more external attributes match the one or more internal attributes. The confidence level can be determined for each algorithm individually and/or for the attribute as a whole.

In some embodiments, different algorithms can be used for different types for attributes, such as but not limited to attribute names and attribute values. For example, in more particular embodiments, activity 410 can further comprise: (1) mapping at least one external attribute name to at least one internal attribute name using the first set of rules that comprise the ensemble learning technique comprising the plurality of algorithms, and also (2) mapping at least one external attribute value to at least one internal attribute value using a search pruning feature and a Jaro-Winkler algorithm.

In a conventional Jaro-Winkler distance calculation, the Jaro distance $d_j$ of two given strings $s_1$ and $s_2$ is $$d_j = \begin{cases} 0 \\ \frac{1}{3}\left(\frac{m}{|s_1|} + \frac{m}{|s_2|} + \frac{m-t}{m}\right) \end{cases}$$

where m is the number of matching characters and t is half the number of transposition between characters.

It is noted use of a conventional Jaro-Winkler algorithm for very long strings for tens of thousands of products requires a significant amount of both computer bandwidth and time. To improve the operating efficiency of system 300 (FIG. 3), many embodiments of method 400 utilize a modified approach to the Jaro-Winkler algorithm for mapping attribute values that can include, among other things, a search pruning feature. For example, the activity of mapping the at least one external attribute value to the at least one internal attribute value using the search pruning feature and the Jaro-Winkler algorithm can comprise determining a maximum possible score for the at least one external attribute value and the at least one internal attribute value. In more particular embodiments, the activity of determining the maximum possible score for the at least one external attribute value and the at least one internal attribute value can comprise, for each product of the plurality of products: (1) creating a first bitset for the at least one external attribute value and a second bitset for the at least one internal attribute value, and also (2) determining the maximum possible score by determining a maximum number of characters in common between the first bit set and the second bit set. In many embodiments, the characters of the attribute values can be whole words, individual letters, and/or individual numbers. Determining the maximum possible score in this manner compares bitsets rather than each character in two strings.

Continuing on, the activity of mapping the at least one external attribute value to the at least one internal attribute value using the search pruning feature and the Jaro-Winkler algorithm can further comprise, determining a Jaro-Winkler distance between the at least one external attribute value and the at least one internal attribute value using the Jaro-Winkler algorithm if (and only if) the maximum possible score is greater than a first predetermined threshold. If the maximum possible score is less than the first predetermined threshold, no Jaro-Winkler distance is calculated using the Jaro-Winkler algorithm. Because computers are fast with bit level operations compared to string level operations, this activity can improve efficiency of operation for system 300 (FIG. 3) because system 300 (FIG. 3) is no longer required to calculate the Jaro-Winkler distance for every attribute value.

In many embodiments, various aspects of the embodiments described above can be combined into a single embodiment. For example, activity 410 can comprise, for each product of the plurality of products: inputting at least one external attribute name and at least one internal attribute name into two or more of the plurality of algorithms; determining the at least one external attribute name matches the at least one internal attribute name when a majority of outputs of the two or more of plurality of algorithms match the at least one external attribute name with the at least one internal attribute name after the at least one external attribute name and the at least one internal attribute name have been inputted into the plurality of algorithms; determining a confidence level that the at least one external attribute name matches the at least one internal attribute name; and mapping the at least one external attribute value to the at least one internal attribute value using a search pruning feature and a Jaro-Winkler algorithm by (1) determining a maximum possible score for the at least one external attribute value and the at least one internal attribute value by (a) creating a first bitset for the at least one external attribute value and a second bitset for the at least one internal attribute value, and (b) determining the maximum possible score by determining a maximum number of characters in common between the first bit set and the second bit set, and (2) if the maximum possible score is greater than a first predetermined threshold, determining a Jaro-Winkler distance between the at least one external attribute value and the at least one internal attribute value using the Jaro-Winkler algorithm.

In many embodiments, activity 410 also can comprise inputting each external attribute into the plurality of algorithms and determining predetermined top number of internal attributes in the internal catalog to which the external attribute matches using the plurality of algorithms. For example, the top five internal attributes of the internal catalog can be determined for each external attribute of the external catalog using the plurality of algorithms. In some embodiments, activity 410 and other activities in method 400 can comprise using a distributed network comprising distributed memory architecture to perform the associated activity. This distributed architecture can reduce the impact on the network and system resources to reduce congestion in bottlenecks while still allowing data to be accessible from a central location.

Method 400 can further comprise an activity 415 of, for each product of the plurality of products, incorporating the one or more external attributes of the external catalog into the one or more internal attributes in the internal catalog as mapped. Incorporating the one or more external attributes of the external catalog into the one or more internal attribute in the internal catalog can comprise, for example adding additional product data from the external catalog to the product data in the internal catalog. Returning to the example of warranty information in the external catalog, the warranty information from the external catalog can be incorporated into one or more of warranty length, warrant type, and/or warranty url in the internal catalog. In many embodiments, the results of the mapping also are stored in a manner such that system 300 (FIG. 3) is not required to map the external attributes again.

Method 400 can further comprise an activity 420 of, for each product of the plurality of products, coordinating displaying of the one or more external attributes and the one or more internal attributes on a web site of the online retailer. Returning to the example of warranty information. Returning to the example of warranty information in the external catalog, the warranty information from the external catalog can be displayed on the website of the online retailer as incorporated into one or more of warranty length, warrant type, and/or warranty url.

In many embodiments, method 400 can optionally comprise additional search pruning activities that can occur before or after any of the activities previously described. These additional search pruning activities also improve the operation of system 300 (FIG. 3) by reducing the computer bandwidth and overall time required to perform the activities of method 400. In some embodiments, for example, an additional search pruning activity can eliminate a portion of the mapping required by system 300 (FIG. 3) based on a number of distinct values in attribute counts. Thus, method 400 can comprise an activity of determining a number of distinct values for each of the one or more internal attributes of the plurality of products in the internal catalog. This activity can determine, for example, that the internal catalog includes more than 20 million distinct global trade item numbers (GTIN) and more than 20 million distinct universal product codes (UPC). Because these counts are high, and thus unique to a particular product, there is no need for system 300 to compare these internal attributes to external attributes for mapping. Once a predetermined threshold is established, method 400 can optionally comprise activities of determining the number of distinct values for at least one of the one or more internal attributes is above the predetermined threshold. Finally, method 400 also can optionally comprise an activity of withholding the at least one of the one or more internal attributes that is above the predetermined threshold from, for each product of the plurality of products, mapping the one or more external attributes from the external catalog to the one or more internal attributes for each product of the plurality of products in the internal catalog. The activity of withholding the at least one of the one or more internal attributes from the activity of mapping, in turn, improves the overall efficiency of system 300 (FIG. 3) in performing method 400.

In some embodiments, an additional search pruning activity can eliminate a portion of the mapping required by system 300 (FIG. 3) based on a number of characters in an each internal attribute. The number of characters can comprise one or more of (1) an average minimum number of character in a product attribute for the plurality of products, (2) an average maximum number of characters in a product attribute for the plurality of products, and/or (3) a standard deviation in the number of characters in a product attribute for a plurality of products. Thus, method 400 can comprise an activity of determining, for each of the one or more internal attributes of the plurality of products, at least one of (1) an average minimum number of characters, (2) an average maximum number of characters, or (3) a standard deviation of a number of characters.

For example, system 300 (FIG. 3) can determine that the standard deviation for the number of characters in the warranty information attribute for all of the plurality of products in the internal catalog is approximately 1100 words. This large standard deviation indicates that the number of characters in the warranty information varies greatly among the plurality of products. As another example, system 300 (FIG. 3) can determine that the standard deviation for the number of characters in the scent attribute for all of the plurality of products in the internal catalog is less than 10 characters. This small standard deviation indicates that the number of characters in the scent attributes varies little among the plurality of products. If, then, a received external attribute is over 1000 characters, there is no need to compare the received external attribute to an internal attribute such as scent, with less than 10 characters standard deviation because there is essentially no chance that the received external attribute will match the internal attribute of scent.

In many embodiments, a predetermined threshold is established for variance from the average minimum number of characters, the average maximum number of characters, and/or the standard deviation of the number of characters of each internal attribute. The predetermined threshold for variance can be proportional to the average the average minimum number of characters, the average maximum number of characters, and/or the standard deviation of the number of characters of each internal attribute. For example, a first product attribute with a higher standard deviation of the number of characters can have a larger (or wider) predetermined threshold for variance from the standard deviation than a second product attribute with a lower standard deviation of the number of characters. Method 400, then, can optionally comprise an activity of determining, for at least one of the one or more internal attributes, at least one of (1) the average minimum number of characters is outside a third predetermined threshold, (2) the average maximum number of characters is outside the third predetermined threshold, or (3) the standard deviation of the number of characters is outside the third predetermined threshold.

If system 300 (FIG. 3) determines that a received external attribute is outside the predetermined threshold, method 400 can then comprise an activity of withholding the at least one of the one or more internal attributes that is outside the third predetermined threshold from, for each product of the plurality of products, mapping the one or more external attributes from the external catalog to the one or more internal attributes for each product of the plurality of products in the internal catalog.

FIG. 5 illustrates a block diagram of a portion of system 300 comprising attribute normalization system 310, web server 320, and display system 360, according to the embodiment shown in FIG. 3. Each of attribute normalization system 310, web server 320, and display system 360, is merely exemplary and not limited to the embodiments presented herein. Each of attribute normalization system 310, web server 320, and/or display system 360, can be employed in many different embodiments or examples not specifically depicted or described herein. In some embodiments, certain elements or modules of attribute normalization system 310, web server 320, and/or display system 360, can perform various procedures, processes, and/or acts. In other embodiments, the procedures, processes, and/or acts can be performed by other suitable elements or modules.

In many embodiments, attribute normalization system 310 can comprise non-transitory memory storage module 512. Memory storage module 512 can be referred to as attribute normalization module 512. In many embodiments, attribute normalization module 512 can store computing instructions configured to run on one or more processing modules and perform one or more acts of method 400 (FIG. 4) (e.g., activity 405 of receiving an external catalog comprising one or more external attributes for each product of a plurality of products, activity 410 of mapping the one or more external attributes from the external catalog to one or more internal attributes for each product of the plurality of products in an internal catalog for an online retailer using a first set of rules that comprise an ensemble learning technique comprising a plurality of algorithms, and activity 415 of incorporating the one or more external attributes of the external catalog into the one or more internal attributes in the internal catalog as mapped (FIG. 4)).

In many embodiments, display system 360 can comprise non-transitory storage module 562. Memory storage module 562 can be referred to as display module 562. In many embodiments, display module 562 can store computing instructions configured to run on one or more processing modules and perform one or more acts of method 400 (FIG. 4) (e.g., activity 420 of coordinating displaying of the one or more external attributes and the one or more internal attributes on a website of the online retailer (FIG. 4)).

Although systems and methods for matching product data from an external catalog with product data from an internal catalog have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-5 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   one or more processors; and
   one or more non-transitory storage devices storing computing instructions configured to run on the one or more processors and perform:
   receiving an external catalog from a first system that is external to the system, the external catalog comprising two or more respective external attributes for each respective product of a plurality of products; and
   for each respective product of the plurality of products:
   determining, for an internal catalog of an online retailer, a respective number of distinct values for each respective internal attribute of one or more internal attributes for each respective product of the plurality of products;
   identifying, as a first group of the one or more internal attributes, the respective number of distinct values for at least one respective internal attribute of the one or more internal attributes that are above a catalog predetermined threshold;
   in response to identifying the first group of the one or more internal attributes, mapping the two or more respective external attributes from the external catalog to one or more respective internal attributes that are not part of the first group of the one or more internal attributes for each respective product of the plurality of products using a first set of rules that comprise an ensemble learning technique comprising a plurality of algorithms, wherein:
   a first respective external attribute of the two or more respective external attributes is mapped using the first set of rules that comprise the ensemble learning technique comprising the plurality of algorithms; and
   a second respective external attribute of the two or more respective external attributes is mapped using a modified Jaro-Winkler algorithm utilizing a search pruning feature that compares bitsets of the second respective external attribute and the one or more respective internal attributes;
   incorporating the two or more respective external attributes from the external catalog into the one or more respective internal attributes in the internal catalog, as mapped; and
   coordinating displaying the two or more respective external attributes and the one or more respective internal attributes on a website of the online retailer.

2. The system of claim 1, wherein the plurality of algorithms used in the ensemble learning technique of the first set of rules comprise two or more string distance algorithms.

3. The system of claim 2, wherein the two or more string distance algorithms comprise at least one of a cosine similarity algorithm, a Levenshtein distance algorithm, a Jaro-Winkler distance algorithm, a n-gram distance algorithm, or a BM25 similarity algorithm.

4. The system of claim 1, wherein mapping the two or more respective external attributes comprises, for each respective product of the plurality of products:

inputting the two or more respective external attributes and the one or more respective internal attributes into each algorithm of the plurality of algorithms;
determining the two or more respective external attributes match the one more respective internal attributes when a majority of respective outputs of the plurality of algorithms match the two or more respective external attributes with the one or more respective internal attributes; and
determining a respective confidence level that the two or more respective external attributes match the one or more respective internal attributes.

5. The system of claim 1, wherein:
the first respective external attribute of the two or more respective external attributes for each respective product of the plurality of products comprises at least one respective external attribute name for each respective product of the plurality of products;
the second respective external attribute of the two or more respective external attributes for each respective product of the plurality of products comprises at least one respective external attribute value for each respective product of the plurality of products;
the one or more respective internal attributes for each respective product of the plurality of products comprise (1) at least one respective internal attribute name and (2) at least one respective internal attribute value for each respective product of the plurality of products; and
mapping the two or more respective external attributes comprises, for each respective product of the plurality of products:
mapping the at least one respective external attribute name to the at least one respective internal attribute name using the first set of rules that comprise the ensemble learning technique comprising the plurality of algorithms; and
mapping the at least one respective external attribute value to the at least one respective internal attribute value using the modified Jaro-Winkler algorithm utilizing the search pruning feature.

6. The system of claim 5, wherein mapping the at least one respective external attribute value to the at least one respective internal attribute value using the modified Jaro-Winkler algorithm utilizing the search pruning feature comprises, for each respective product of the plurality of products:
determining a respective maximum possible score for the at least one respective external attribute value and the at least one respective internal attribute value; and
when the respective maximum possible score is greater than a first predetermined threshold, determining a Jaro-Winkler distance between the at least one respective external attribute value and the at least one respective internal attribute value using the modified Jaro-Winkler algorithm utilizing the search pruning feature.

7. The system of claim 6, wherein determining the respective maximum possible score for the at least one respective external attribute value and the at least one respective internal attribute value comprises, for each respective product of the plurality of products:
creating a first respective bitset for the at least one respective external attribute value and a second respective bitset for the at least one respective internal attribute value; and
determining the respective maximum possible score by determining a respective maximum number of characters in common between the first respective bitset and the second respective bitset.

8. The system of claim 1, wherein the one or more non-transitory storage devices storing the computing instructions are further configured to run on the one or more processors and perform:
determining, for each respective internal attribute of the one or more internal attributes of the plurality of products, at least one of (1) a respective average minimum number of characters, (2) a respective average maximum number of characters, or (3) a respective standard deviation of a number of characters;
determining, for at least one respective internal attribute of the one or more internal attributes, at least one of (1) the respective average minimum number of characters is outside of a third predetermined threshold, (2) the respective average maximum number of characters is outside of the third predetermined threshold, or (3) the respective standard deviation of the number of characters is outside of the third predetermined threshold; and
withholding the at least one respective internal attribute of the one or more internal attributes that is outside of the third predetermined threshold from, for each respective product of the plurality of products, mapping the two or more respective external attributes from the external catalog to the one or more respective internal attributes for each respective product of the plurality of products in the internal catalog.

9. The system of claim 1, wherein:
the plurality of algorithms used in the ensemble learning technique of the first set of rules comprise two or more string distance algorithms;
the two or more string distance algorithms comprise at least one of a cosine similarity algorithm, a Levenshtein distance algorithm, a Jaro-Winkler distance algorithm, a n-gram distance algorithm, or a BM25 similarity algorithm;
the first respective external attribute of the two or more respective external attributes for each respective product of the plurality of products comprises at least one respective external attribute name for each respective product of the plurality of products;
the second respective external attribute of the two or more respective external attributes for each respective product of the plurality of products comprises at least one respective external attribute value for each respective product of the plurality of products;
the one or more respective internal attributes for each respective product of the plurality of products comprise (1) at least one respective internal attribute name and (2) at least one respective internal attribute value for each respective product of the plurality of products;
mapping the two or more respective external attributes comprises, for each respective product of the plurality of products:
inputting the at least one respective external attribute name and the at least one respective internal attribute name into two or more of the plurality of algorithms;
determining the at least one respective external attribute name matches the at least one respective internal attribute name when a majority of respective outputs of the two or more of the plurality of algorithms match the at least one respective external attribute name with the at least one respective internal attribute name;
determining a respective confidence level that the at least one respective external attribute name matches the at least one respective internal attribute name; and
mapping the at least one respective external attribute value to the at least one respective internal attribute value using the modified Jaro-Winkler algorithm utilizing the search pruning feature by:
determining a respective maximum possible score for the at least one respective external attribute value and the at least one respective internal attribute value by:
creating a first respective bitset for the at least one respective external attribute value and a second respective bitset for the at least one respective internal attribute value; and
determining the respective maximum possible score by determining a respective maximum number of characters in common between the first respective bitset and the second respective bitset; and
when the respective maximum possible score is greater than a first predetermined threshold, determining a Jaro-Winkler distance between the at least one respective external attribute value and the at least one respective internal attribute value using the modified Jaro-Winkler algorithm utilizing the search pruning feature; and
the one or more non-transitory storage devices storing the computing instructions are further configured to run on the one or more processors and perform:
determining, for each respective internal attribute of the one or more internal attributes of the plurality of products, at least one of (1) a respective average minimum number of characters, (2) a respective average maximum number of characters, or (3) a respective standard deviation of a number of characters;
determining, for at least one respective internal attribute of the one or more internal attributes, at least one of (1) the respective average minimum number of characters is outside of a third predetermined threshold, (2) the respective average maximum number of characters is outside of the third predetermined threshold, or (3) the respective standard deviation of the number of characters is outside of the third predetermined threshold; and
withholding the at least one respective internal attribute of the one or more internal attributes that is outside of the third predetermined threshold from, for each respective product of the plurality of products, mapping the two or more respective external attributes from the external catalog to the one or more respective internal attributes for each respective product of the plurality of products in the internal catalog.

10. The system of claim 5, wherein the at least one respective external attribute name comprises certification, warranty, RAM, or processor.

11. A method implemented via execution of computing instructions configured to run at one or more processors and configured to be stored at non-transitory computer-readable media, the method comprising:
receiving an external catalog from a first system that is external to a system, the external catalog comprising two or more respective external attributes for each respective product of a plurality of products, and the system comprising the computing instructions and the one or more processors; and for each respective product of the plurality of products:

determining, for an internal catalog of an online retailer, a respective number of distinct values for each respective internal attribute of one or more internal attributes for each respective product of the plurality of products;

identifying, as a first group of the one or more internal attributes, the respective number of distinct values for at least one respective internal attribute of the one or more internal attributes that are above a catalog predetermined threshold;

in response to identifying the first group of the one or more internal attributes, mapping the two or more respective external attributes from the external catalog to one or more respective internal attributes that are not part of the first group of the one or more internal attributes for each respective product of the plurality of products using a first set of rules that comprise an ensemble learning technique comprising a plurality of algorithms, wherein:

a first respective external attribute of the two or more respective external attributes is mapped using the first set of rules that comprise the ensemble learning technique comprising the plurality of algorithms; and a second respective external attribute of the two or more respective external attributes is mapped using a modified Jaro-Winkler algorithm utilizing a search pruning feature that compares bitsets of the second respective external attribute and the one or more respective internal attributes;

incorporating the two or more respective external attributes from the external catalog into the one or more respective internal attributes in the internal catalog, as mapped; and coordinating displaying the two or more respective external attributes and the one or more respective internal attributes on a website of the online retailer.

12. The method of claim 11, wherein the plurality of algorithms used in the ensemble learning technique of the first set of rules comprise two or more string distance algorithms.

13. The method of claim 12, wherein the two or more string distance algorithms comprise at least one of a cosine similarity algorithm, a Levenshtein distance algorithm, a Jaro-Winkler distance algorithm, a n-gram distance algorithm, or a BM25 similarity algorithm.

14. The method of claim 11, wherein mapping the two or more respective external attributes comprises, for each respective product of the plurality of products:

inputting the two or more respective external attributes and the one or more respective internal attributes into each algorithm of the plurality of algorithms;

determining the two or more respective external attributes match the one more respective internal attributes when a majority of respective outputs of the plurality of algorithms match the two or more respective external attributes with the one or more respective internal attributes; and determining a respective confidence level that the two or more respective external attributes match the one or more respective internal attributes.

15. The method of claim 11, wherein:

the first respective external attribute of the two or more respective external attributes for each respective product of the plurality of products comprises at least one respective external attribute name for each respective product of the plurality of products;

the second respective external attribute of the two or more respective external attributes for each respective product of the plurality of products comprises at least one respective external attribute value for each respective product of the plurality of products;

the one or more respective internal attributes for each respective product of the plurality of products comprise (1) at least one respective internal attribute name and (2) at least one respective internal attribute value for each respective product of the plurality of products; and mapping the two or more respective external attributes comprises, for each respective product of the plurality of products:

mapping the at least one respective external attribute name to the at least one respective internal attribute name using the first set of rules that comprise the ensemble learning technique comprising the plurality of algorithms; and mapping the at least one respective external attribute value to the at least one respective internal attribute value using the modified Jaro-Winkler algorithm utilizing the search pruning feature.

16. The method of claim 15, mapping the at least one respective external attribute value to the at least one respective internal attribute value using the modified Jaro-Winkler algorithm utilizing the search pruning feature comprises, for each respective product of the plurality of products:

determining a respective maximum possible score for the at least one respective external attribute value and the at least one respective internal attribute value; and when the respective maximum possible score is greater than a first predetermined threshold, determining a Jaro-Winkler distance between the at least one respective external attribute value and the at least one respective internal attribute value using the modified Jaro-Winkler algorithm utilizing the search pruning feature.

17. The method of claim 16, wherein determining the respective maximum possible score for the at least one respective external attribute value and the at least one respective internal attribute value comprises, for each respective product of the plurality of products:

creating a first respective bitset for the at least one respective external attribute value and a second respective bitset for the at least one respective internal attribute value; and determining the respective maximum possible score by determining a respective maximum number of characters in common between the first respective bitset and the second respective bitset.

18. The method of claim 11, further comprising:

determining, for each respective internal attribute of the one or more internal attributes of the plurality of products, at least one of (1) a respective average minimum number of characters, (2) a respective average maximum number of characters, or (3) a respective standard deviation of a number of characters;

determining, for at least one respective internal attribute of the one or more internal attributes, at least one of (1) the respective average minimum number of characters is outside of a third predetermined threshold, (2) the respective average maximum number of characters is outside of the third predetermined threshold, or (3) the respective standard deviation of the number of characters is outside of the third predetermined threshold; and withholding the at least one respective internal attribute of the one or more internal attributes that is outside of the third predetermined threshold from, for each respective product of the plurality of products, mapping the two or more respective external attributes from the external catalog to the one or more respective internal attributes for each respective product of the plurality of products in the internal catalog.

19. The method of claim 11, wherein:

the plurality of algorithms used in the ensemble learning technique of the first set of rules comprise two or more string distance algorithms;

the two or more string distance algorithms comprise at least one of a cosine similarity algorithm, a Levenshtein distance algorithm, a Jaro-Winkler distance algorithm, a n-gram distance algorithm, or a BM25 similarity algorithm;

the first respective external attribute of the two or more respective external attributes for each respective product of the plurality of products comprises at least one respective external attribute name for each respective product of the plurality of products;

the second respective external attribute of the two or more respective external attributes for each respective product of the plurality of products comprises at least one respective external attribute value for each respective product of the plurality of products;

the one or more respective internal attributes for each respective product of the plurality of products comprise (1) at least one respective internal attribute name and (2) at least one respective internal attribute value for each respective product of the plurality of products;

mapping the two or more respective external attributes comprises, for each respective product of the plurality of products:
  inputting the at least one respective external attribute name and the at least one respective internal attribute name into two or more of the plurality of algorithms;
  determining the at least one respective external attribute name matches the at least one respective internal attribute name when a majority of respective outputs of the two or more of the plurality of algorithms match the at least one respective external attribute name with the at least one respective internal attribute name;
  determining a respective confidence level that the at least one respective external attribute name matches the at least one respective internal attribute name; and
  mapping the at least one respective external attribute value to the at least one respective internal attribute value using the modified Jaro-Winkler algorithm utilizing the search pruning feature by:
    determining a respective maximum possible score for the at least one respective external attribute value and the at least one respective internal attribute value by:
      creating a first respective bitset for the at least one respective external attribute value and a second respective bitset for the at least one respective internal attribute value; and
      determining the respective maximum possible score by determining a respective maximum number of characters in common between the first respective bitset and the second respective bitset; and
    when the respective maximum possible score is greater than a first predetermined threshold, determining a Jaro-Winkler distance between the at least one respective external attribute value and the at least one respective internal attribute value using the modified Jaro-Winkler algorithm utilizing the search pruning feature; and the method further comprises:
  determining, for each respective internal attribute of the one or more internal attributes of the plurality of products, at least one of (1) a respective average minimum number of characters, (2) a respective average maximum number of characters, or (3) a respective standard deviation of a number of characters;
  determining, for at least one respective internal attribute of the one or more internal attributes, at least one of (1) the respective average minimum number of characters is outside of a third predetermined threshold, (2) the respective average maximum number of characters is outside of the third predetermined threshold, or (3) the respective standard deviation of the number of characters is outside of the third predetermined threshold; and
  withholding the at least one respective internal attribute of the one or more internal attributes that is outside of the third predetermined threshold from, for each respective product of the plurality of products, mapping the two or more respective external attributes from the external catalog to the one or more respective internal attributes for each respective product of the plurality of products in the internal catalog.

20. The method of claim 15, wherein the at least one respective external attribute name comprises certification, warranty, RAM, or processor.

* * * * *